(12) United States Patent
Chen et al.

(10) Patent No.: US 11,826,707 B2
(45) Date of Patent: Nov. 28, 2023

(54) ISOLATION CHIP FOR ISOLATING TARGET PARTICLES FROM LIQUID SAMPLE, AND DEVICE AND METHOD FOR DETECTING THE TARGET PARTICLES

(71) Applicant: WELLSIM BIOMEDICAL TECHNOLOGIES, INC, Rodeo, CA (US)

(72) Inventors: Yuchao Chen, Rodeo, CA (US); Fei Liu, Cupertino, CA (US)

(73) Assignee: WELLSIM BIOMEDICAL TECHNOLOGIES, INC

( * ) Notice: Subject to any disclaimer, the term of this patent is extended or adjusted under 35 U.S.C. 154(b) by 205 days.

(21) Appl. No.: 17/195,922

(22) Filed: Mar. 9, 2021

(65) Prior Publication Data

US 2021/0283552 A1    Sep. 16, 2021

Related U.S. Application Data

(60) Provisional application No. 63/077,692, filed on Sep. 13, 2020, provisional application No. 63/053,475, filed on Jul. 17, 2020, provisional application No. 62/987,791, filed on Mar. 10, 2020.

(51) Int. Cl.
*B01D 15/38* (2006.01)
*B01D 61/58* (2006.01)

(52) U.S. Cl.
CPC ......... *B01D 61/58* (2013.01); *B01D 15/3809* (2013.01); *B01D 2201/29* (2013.01); *B01D 2259/80* (2013.01)

(58) Field of Classification Search
CPC ............ B01D 15/3809; B01D 2201/29; B01D 2259/80
See application file for complete search history.

(56) References Cited

U.S. PATENT DOCUMENTS

| | | |
|---|---|---|
| 2010/0111762 A1 | 5/2010 | Cho |
| 2011/0177530 A1 | 7/2011 | Corcoran et al. |
| 2016/0040213 A1 | 2/2016 | Ludowise et al. |
| 2017/0080420 A1 | 3/2017 | Lowe et al. |
| 2019/0160433 A1 | 5/2019 | Chen |

FOREIGN PATENT DOCUMENTS

| | | | |
|---|---|---|---|
| CN | 109439525 A * | 3/2019 | ............ B01D 61/18 |
| WO | 2013126906 A1 | 8/2013 | |

* cited by examiner

*Primary Examiner* — Bradley R Spies
(74) *Attorney, Agent, or Firm* — ScienBiziP, P.C.

(57) ABSTRACT

An isolation chip for separating and isolating target particles from a bioliquid sample includes a reagent reservoir, a first filtration membrane, a second filtration membrane, a first chamber, and a second chamber. The reagent reservoir includes a first sidewall and a second sidewall opposite to the first sidewall. The first filtration membrane is disposed at an upper portion of the first sidewall. The reagent reservoir defines a first window at a lower portion of the first sidewall. The second filtration membrane is disposed at the second sidewall. The first chamber is connected to the reagent reservoir through the first filtration membrane. The second chamber is connected to the reagent reservoir through the second filtration membrane. A device and a method for detecting the target particles are further provided.

18 Claims, 11 Drawing Sheets

ISOLATION CHIP FOR ISOLATING TARGET PARTICLES FROM LIQUID SAMPLE, AND DEVICE AND METHOD FOR DETECTING THE TARGET PARTICLES

FIELD

The subject matter herein generally relates to biotechnology, and more particularly, to an isolation chip for isolating target particles from a liquid sample, a device for detecting the target particles, and a method for detecting the target particles.

BACKGROUND

Novel coronavirus (SARS-CoV-2) spreading across the world has caused a massive healthcare burden and economic shutdowns. Thus, a faster and more flexible method for detecting the virus is needed. However, known methods usually need two separated devices for purifying the virus and detecting the virus. The processes may be time consuming, and the efficiency low. Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Figure 1:
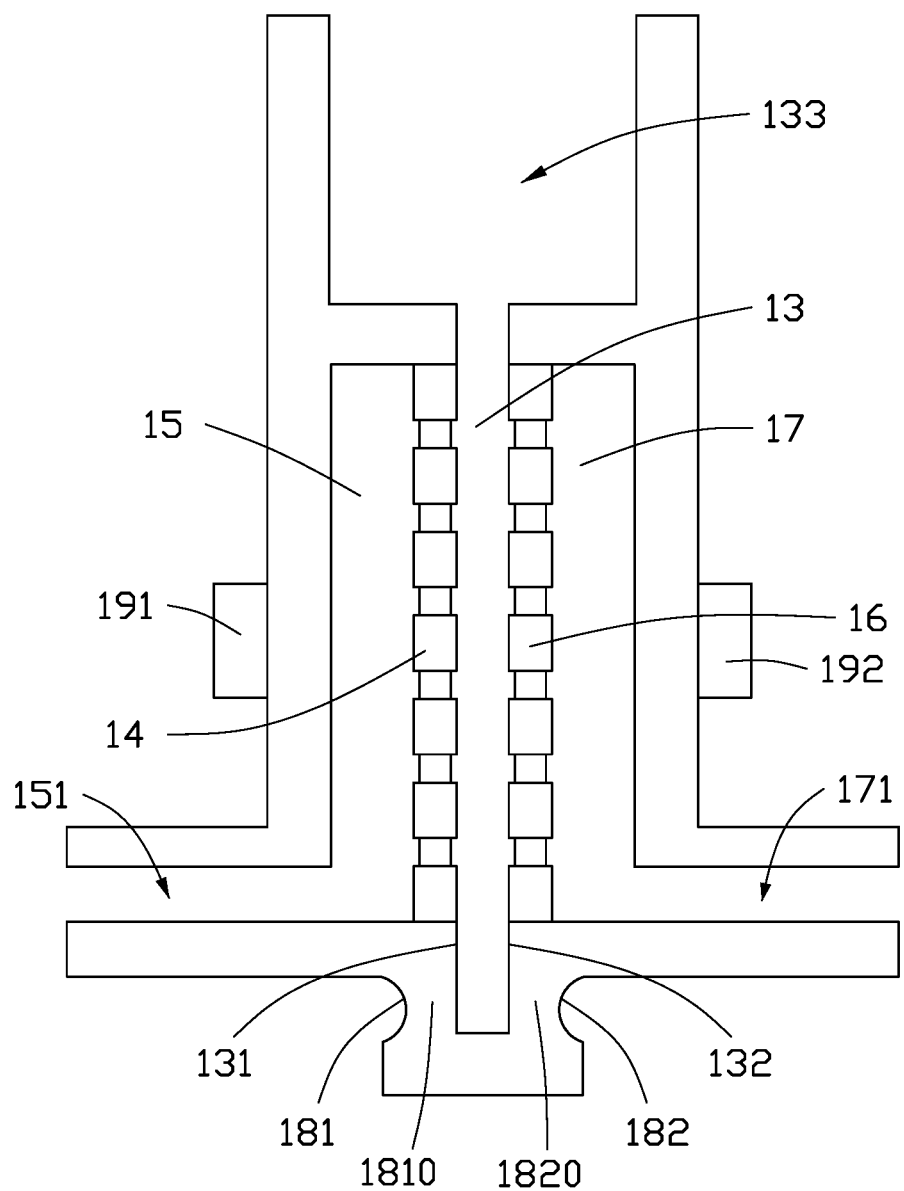
FIG. 1 is a diagrammatic view of an embodiment of an isolation chip according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
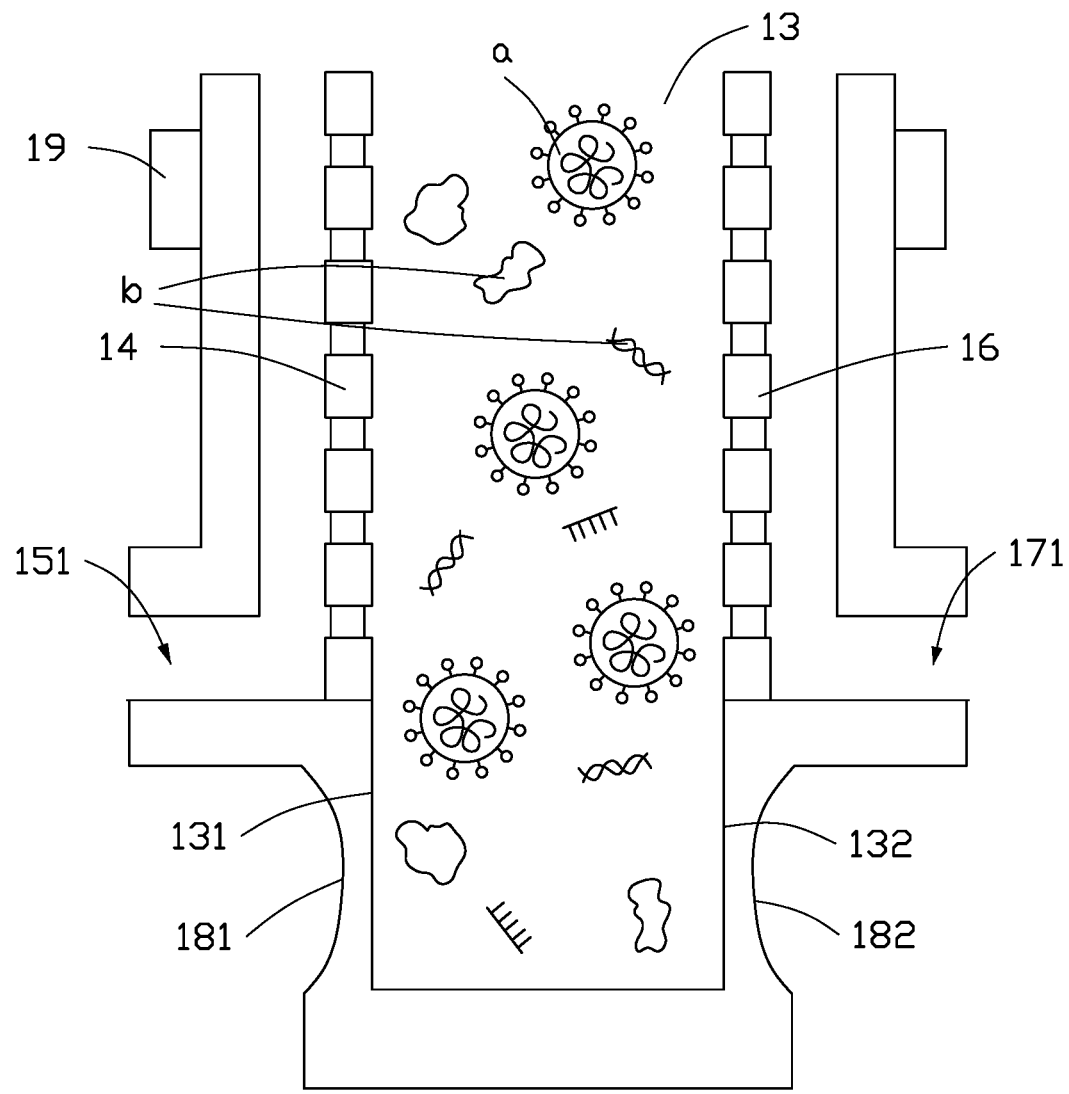
FIG. 2 is a diagrammatic view showing liquid sample being added to the isolation chip of FIG. 1.

FIG. 1 illustrate an embodiment of an isolation chip 10 adapted for isolating and purifying target particles with a certain size from other undesired particles of a liquid sample. The liquid sample can be a bioliquid such as plasma, serum, saliva, urine, and lavage. Referring to FIG. 2, in an embodiment, the target particles "a" can be nanoparticles, including extracellular vesicles, exosomes, viruses (e.g., SARS-CoV-2, 2019-NCoV nucleocapsid proteins) or antibody. The undesired particles "b" can include free nucleic acids or free protein, which need to be separated from the target particles.

Referring to FIG. 1, the isolation chip 10 includes a reagent reservoir 13, a first chamber 15, a second chamber 17, a first filtration membrane 14, and a second filtration membrane 16. The first chamber 15 and the second chamber 17 are positioned at opposite sides of the reagent reservoir 13. The first chamber 15 is connected to the reagent reservoir 13 by the first filtration membrane 14. The first chamber 15 includes a first outlet 151 that connects the first chamber 15 to an ambient environment. The second chamber 17 is connected to the reagent reservoir 13 by the second filtration membrane 16. The second chamber 17 includes a second outlet 171 that connects the second chamber 17 to the ambient environment.

The reagent reservoir 13 includes a first sidewall 131 and a second sidewall 132 opposite to the first sidewall 131. The first filtration membrane 14 is disposed at the upper portion of the first sidewall 131. The second filtration membrane 16 is disposed at the upper portion of the second sidewall 132. The reagent reservoir 13 further defines a first window 181 at the lower portion of the first sidewall 131, and a second window 182 at the lower portion of the second sidewall 132.

In an embodiment, the reagent reservoir 13 defines an inlet 133 on the top. The liquid sample can be added to the reagent reservoir 13 through the inlet 133.

In use, the liquid sample is added to the reagent reservoir 13 through the inlet 133. Each of the first outlet 151 and the second outlet 171 is connected to a vacuum unit 30 (shown in FIG. 6). When the vacuum unit 30 generates a negative pressure in the first chamber 15 through the first outlet 151, compositions (the undesired particles) in the liquid sample that are smaller than the pores of the first filtration membrane 14 can enter the first chamber 15 through the first filtration membrane 14. When the vacuum unit 30 generates a negative pressure in the second chamber 17 through the second outlet 171, compositions in the liquid sample that are smaller than the pores of the second filtration membrane 16 can enter the second chamber 17 through the second filtration membrane 16. Since a negative pressure is alternately applied in the first chamber 15 and the second chamber 17, the compositions in the liquid sample can alternately flow through the first filtration membrane 14 and the second filtration membrane 16. This leaves the target particles that are larger than the pores of the first filtration membrane 14 and the second filtration membrane 16 in the reagent reservoir 13. Furthermore, some of the target particles that are absorbed on the first filtration membrane 14 and the second filtration membrane 16 can be flushed out under the negative pressure, thereby avoiding clogging of the first filtration membrane 14 and the second filtration membrane 16. The target particles after isolation are precipitated at the bottom of the reagent reservoir 13, and thus face the first window 181 and the second window 182.

Subsequently, an enzyme-linked antibody and a chemiluminescent substrate can further be added to the reagent reservoir 13. The target particles can be combined with the antibody to form to-be-detected particles and the enzyme on the antibody can catalyze the chemiluminescent substrate to generate optical signal. Thus, the optical signal from the to-be-detected particles can be collected through the first window 181 and the second window 182. The optical signal can be used to detect information of the target particles.

Referring to FIG. 1, in an embodiment, the isolation chip 10 further includes a first lens 1810 disposed in the first window 181 and a second lens 1820 disposed in the second window 182. Each of the first lens 1810 and the second lens 1820 can be a concave lens. The first lens 1810 and the second lens 1820 can converge the optical signal from the to-be-detected particles, thereby improving the detection sensitivity.

In an embodiment, the isolation chip 10 further includes a first vibrator 191 disposed at an outer sidewall of the first chamber 15 and a second vibrator 192 disposed at an outer sidewall of the second chamber 17. The first vibrator 191 and the second vibrator 192 vibrate to cause the liquid sample in the reagent reservoir 13 to flow, thereby dispersing the particles of different sizes. Furthermore, the target particles that are absorbed on the first filtration membrane 14 and the second filtration membrane 16 can be flushed out when the first vibrator 191 and the second vibrator 192 vibrate, thereby accelerating the isolation of the target particles and further avoiding clogging of the first filtration membrane 14 and the second filtration membrane 16. Each of the first vibrator 191 and the second vibrator 192 may be a motor or a piezo transducer.

Figure 5:
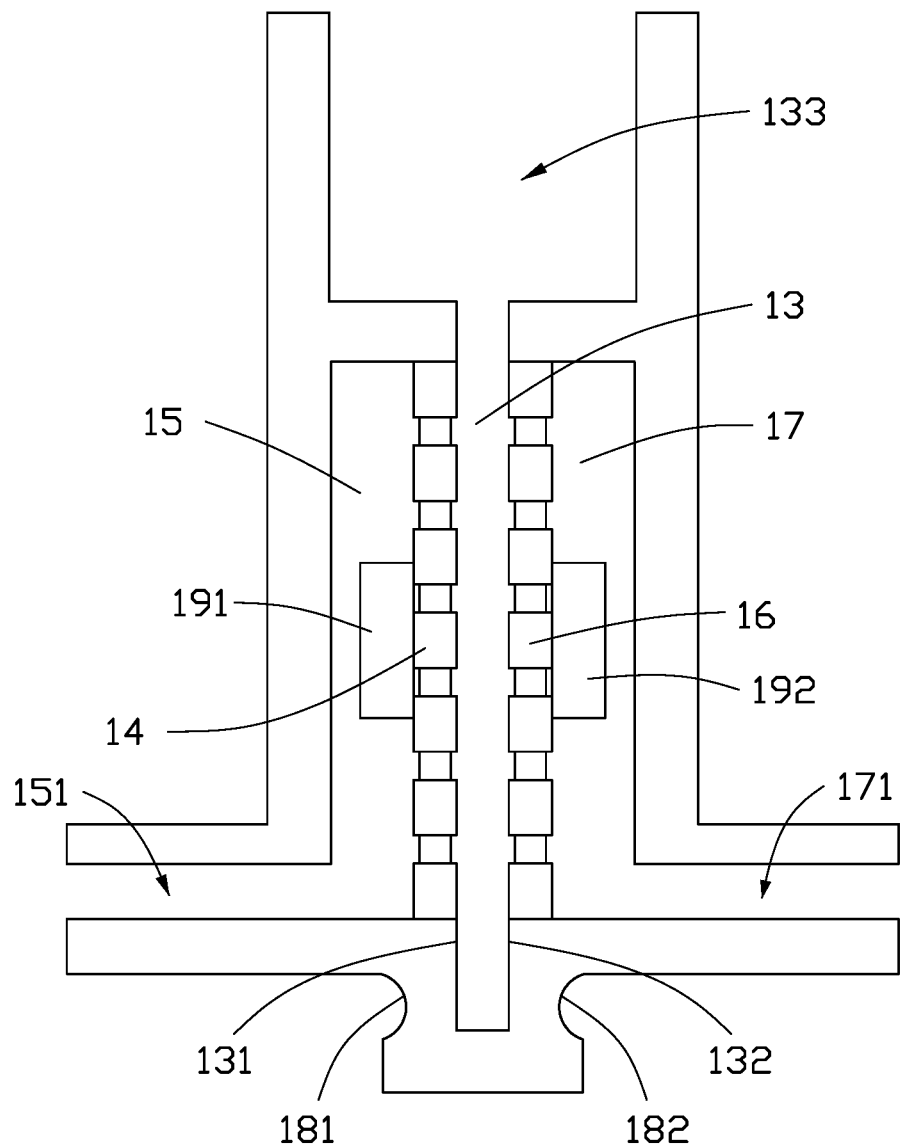
FIG. 5 is a diagrammatic view of another embodiment of an isolation chip according to the present disclosure.

Referring to FIG. 5, in another embodiment, the first vibrator 191 and the second vibrator 192 may be disposed at the first filtration membrane 14 and the second filtration membrane 16, respectively. A frequency of each of the first vibrator 191 and the second vibrator 192 is in a range of 100 Hz to 500 Hz or 5000 Hz to 500 kHz. The vibration at this frequency causes no damage to the target particles. In the embodiment, the frequency of each of the first filtration membrane 14 and the second filtration membrane 16 can be substantially equal to a resonance frequency of the first filter membrane 14 or the second filter membrane 16. Thus, the first filter membrane 14 or the second filter membrane 16 can vibrate with a larger amplitude, thus accelerating the isolation of the target particles and avoiding clogging of the first filtration membrane 14 and the second filtration membrane 16.

Figure 6:
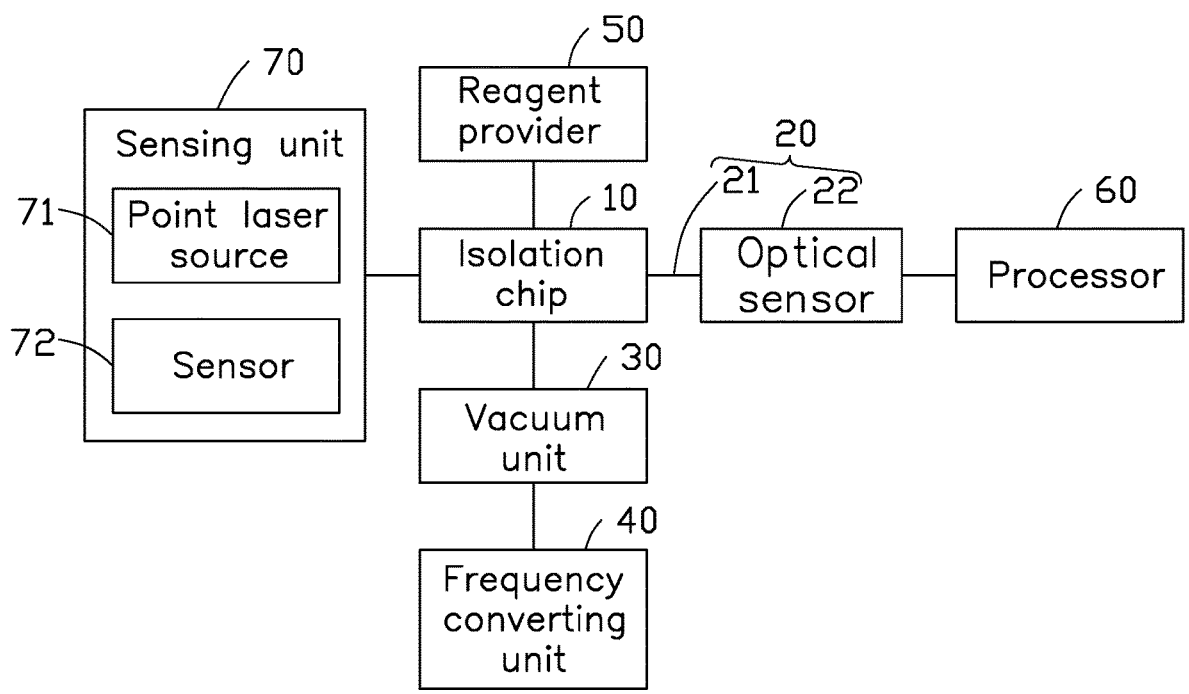
FIG. 6 is a block diagram of an embodiment of a device for detecting target particles according to the present disclosure.

FIG. 6 illustrates an embodiment of a device 100 for detecting the target samples. The device 100 includes at least one isolation chip 10, a vacuum unit 30, a frequency converting unit 40, a light collection unit 20, a reagent provider 50, and a processor 60.

Figure 7:
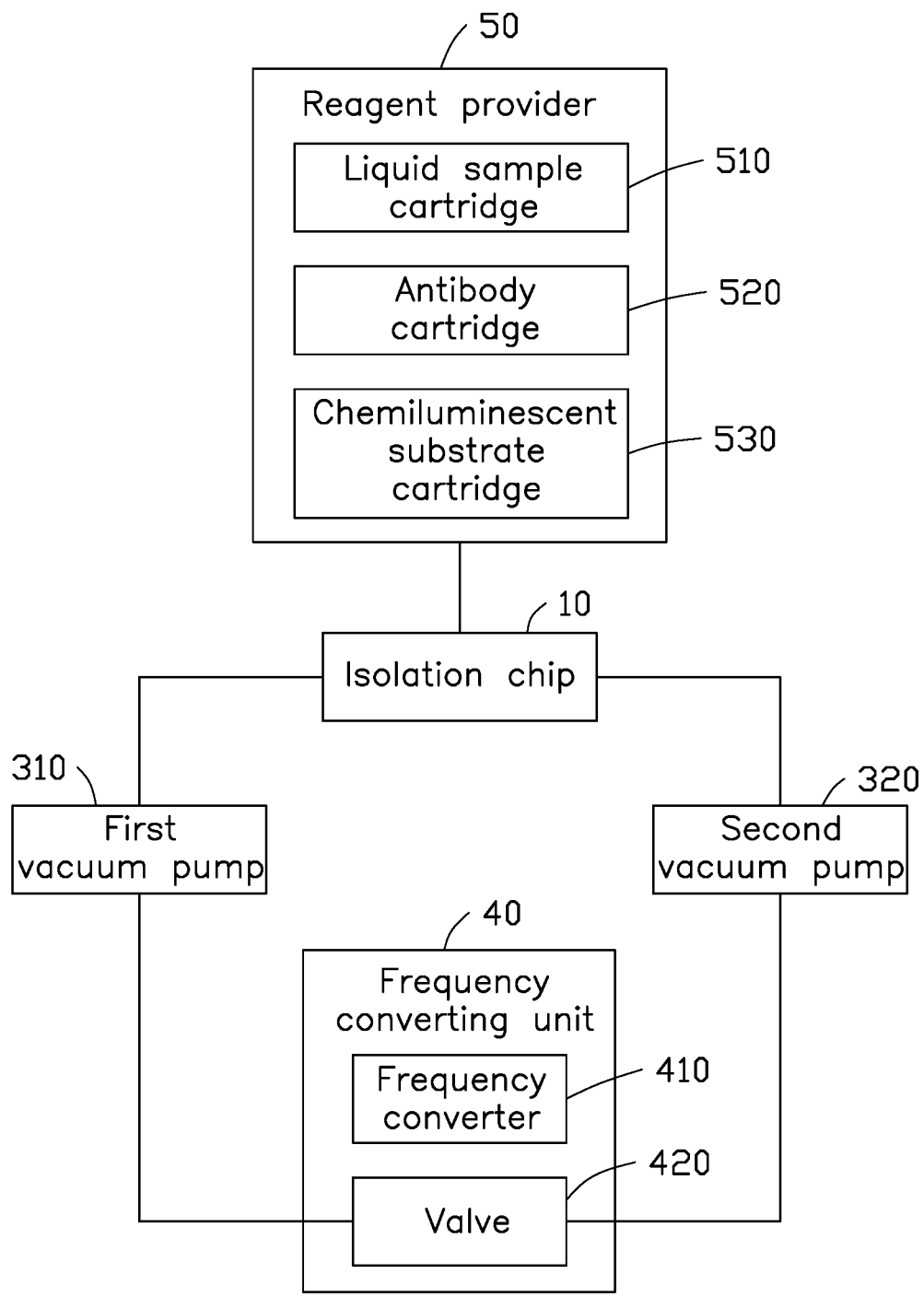
FIG. 7 is a block diagram showing connection among different components of the device of FIG. 6.
Figure 8:
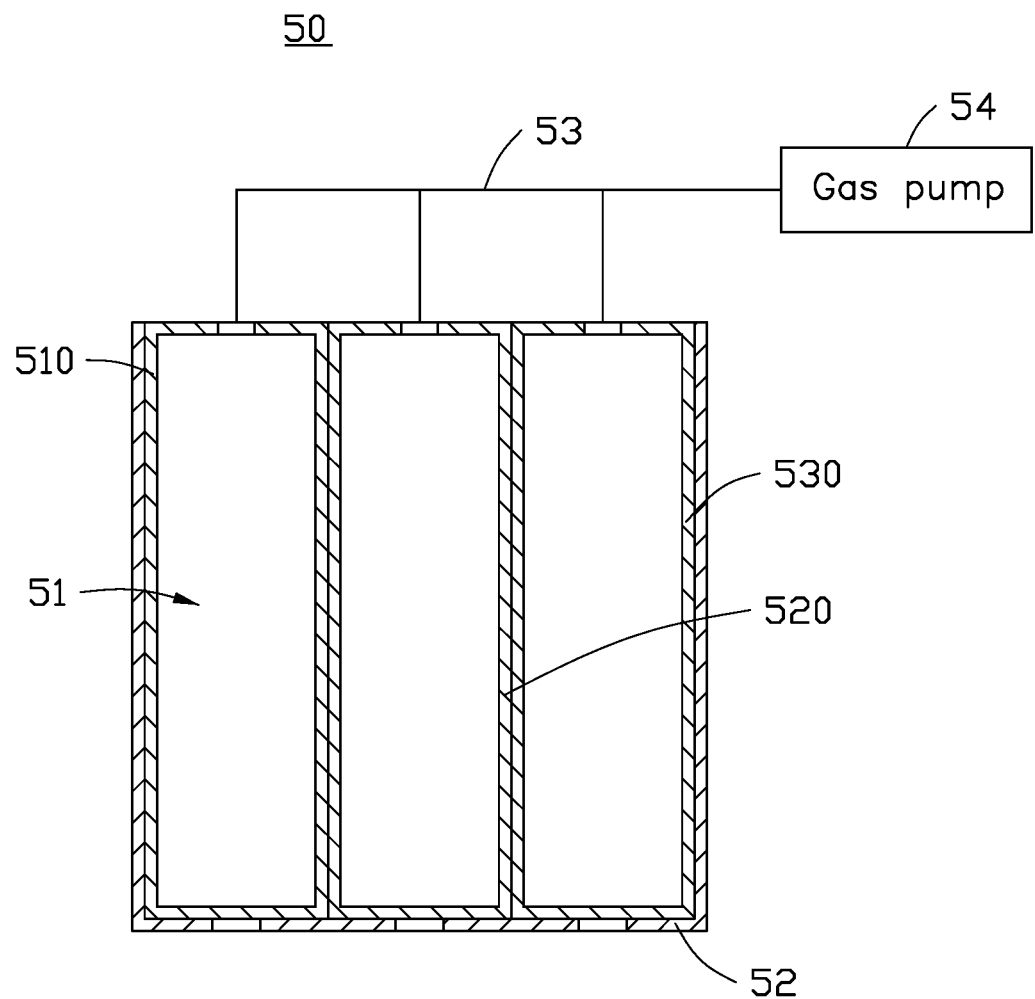
FIG. 8 is a block diagram of a reagent provider of the device of FIG. 6.

Referring to FIGS. 7 and 8, the reagent provider 50 provides the liquid sample, the enzyme-linked antibody, and the chemiluminescent substrate to the reagent reservoir 13 of the isolation chip 10. Referring to FIG. 7, the reagent provider 50 includes a liquid sample cartridge 510 for receiving the liquid sample, an antibody cartridge 520 for receiving the antibody, and a chemiluminescent substrate cartridge 530 for receiving the chemiluminescent substrate.

The liquid sample cartridge 510, the antibody cartridge 520, and the chemiluminescent substrate cartridge 530 are received in a casing and independent from each other. Furthermore, each of the liquid sample cartridge 510, the antibody cartridge 520, and the chemiluminescent substrate cartridge 530 includes a space 51 for receiving the respective reagent, a foil 52 sealed at the bottom of the space 51, and a tube 53 connected to the space 51. Each space 51 is connected to a gas pump 54 through the respective tube 53. The isolation chip 10 further includes a number of pillars (not shown) around the inlet 133. When the reagent provider 50 is mounted on the isolation chip 10, one pillar may successively punch through a through hole of the casing and the foil 52 of the reagent provider 50. The gas pump 54 facilitates the respective reagent to be injected into the reagent reservoir 13.

In an embodiment, the reagent provider 50 can further include a washing buffer cartridge (not shown) for receiving a washing buffer. The washing buffer can wash away the proteins and nucleic acids absorbed on the isolation chip 10.

The vacuum unit 30 alternately generates negative pressures in the first chamber 15 and the second chamber 17. Also referring to FIGS. 1 and 7, in an embodiment, the vacuum unit 30 includes a first vacuum pump 310 and a second vacuum pump 320. The first vacuum pump 310 is connected to the first outlet 151 of the isolation chip 10. The second vacuum pump 320 is connected to the second outlet 171 of the isolation chip 10.

The frequency converting unit 40 is electrically connected to the vacuum unit 30, and provides electric power to the vacuum unit 30. Also referring to FIG. 7, in an embodiment, the frequency converting unit 40 includes a frequency converter 410 and a pair of valves 420 connected to the frequency converter 410. The valves 420 are connect the first vacuum pump 310 and the second vacuum pump 320. The pair of valves 420 can be alternately switched to be opened, to cause the vacuum unit 30 to alternately apply negative pressures in the first chamber 15 and the second chamber 17.

When the target particles are combined with the enzyme-linked antibody to form the to-be-detected particles and react with chemiluminescent substrate to generate optical signal, the light collection unit 20 collects the optical signal from the to-be-detected particles through the first window 181 and the second window 182, and converts the optical signal to electrical signal. Referring to FIG. 6, in an embodiment, the light collection unit 20 includes an optical fiber 21 and an optical sensor 22. The optical fiber 21 connects the first window 181 or the second window 182 to the optical sensor 22. The optical signal is transmitted along the optical fiber 21 to the optical sensor 22. The optical sensor 22 senses the optical signal and converts the optical signal to the electrical signal. In an embodiment, the optical sensor 22 can be a photo-multiplier tube (PMT), a photodiode, a phototransistor, or a silicon photo-multiplier tube.

The processor 50 detects information of the target particles, such as the quality and quantity of the target particles, according to the electrical signal. In detail, the target particles are detected by chemiluminescence immunoassay (CLIA). The processor 50 can be a central processing unit (CPU), a microprocessor, or other data processor chip.

In an embodiment, the light collection unit 20 can simultaneously collect the optical signal through the first window 181 and the second window 182, thereby increasing the intensity of the collected optical signal and improving the detection sensitivity and accuracy.

Referring to FIG. 6, in an embodiment, the device 100 further includes a light sensing unit 70. The light sensing unit 70 detects a liquid level of the reagent in the reagent reservoir 13 to avoid an overloading of reagent. The light sensing unit 70 includes a point laser source 71 and a light sensor 72 aligned with the point laser source 71. The point laser source 71 and the light sensor 72 are disposed outside the isolation chip 10, and at opposite sides of the reagent reservoir 13. The processor 60 is electrically connected to the light sensor 72. The point laser source 71 emits a point laser towards the reagent reservoir 13. When the liquid level is higher than the point laser, light scattering is occurred, resulting in a much lower laser intensity detected by the light sensor 72. Thus, the processor 60 can control the gas pump 54 to stop loading the reagent when the laser intensity detected by the light sensor 72 is lower than a preset intensity.

With the above configuration, isolation and detection of the target particles can both be performed by the single device 100. That is, on-chip detection can be realized.

Figure 9:
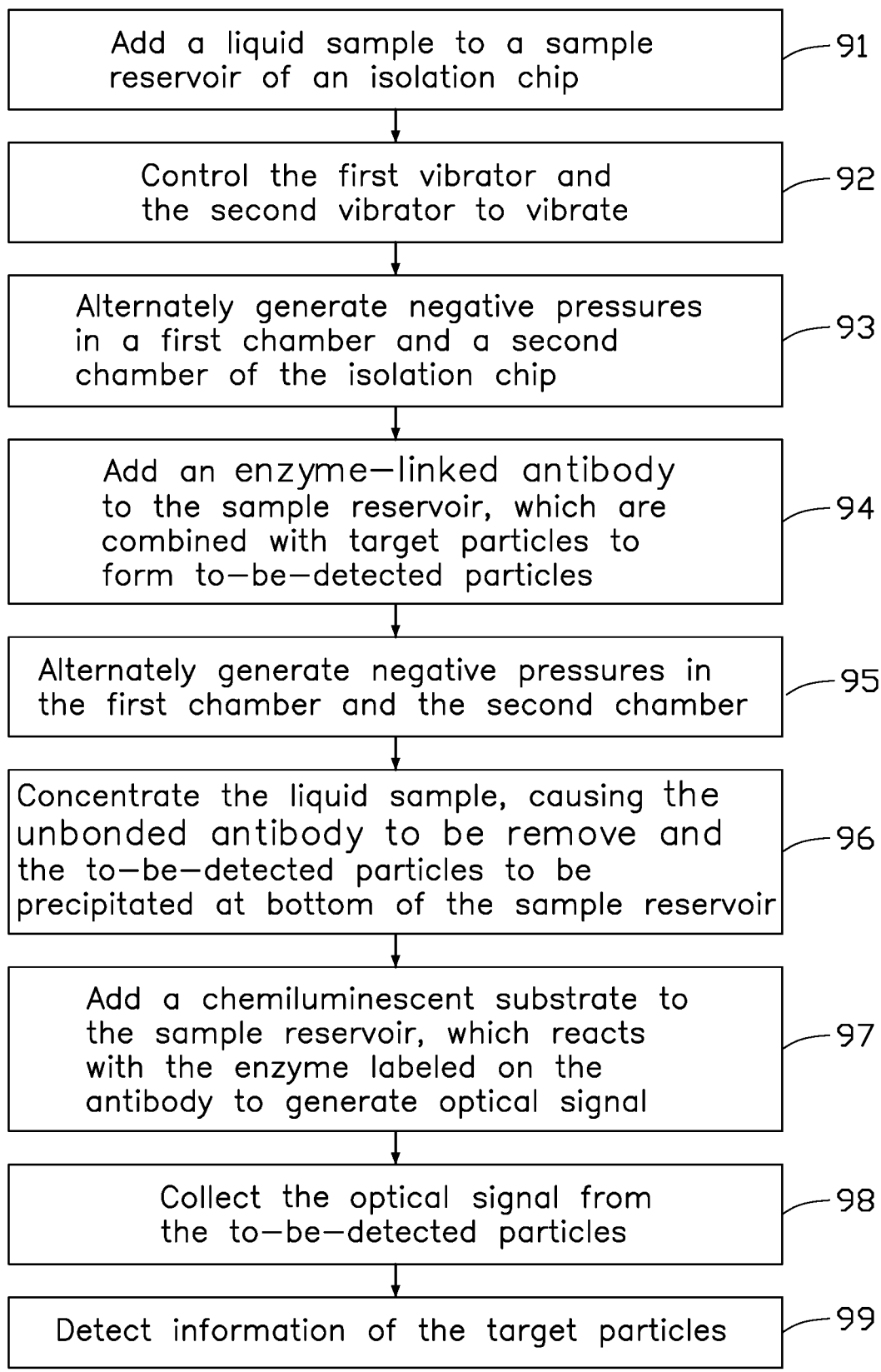
FIG. 9 is a flowchart of an embodiment of a method for detecting target particles according to the present disclosure.

FIG. 9 illustrates an embodiment of a method for detecting target particles. The method is provided by way of embodiment, as there are a variety of ways to carry out the method. The method can begin at block 91.

At block 91, the isolation chip 10 is provided, and the liquid sample is added to the reagent reservoir 13 of the isolation chip 10.

At block 92, the first vibrator 191 and the second vibrator 192 vibrate to cause the liquid sample in the reagent reservoir 13 to flow, thereby dispersing particles of different sizes.

At block 93, the vacuum unit 30 alternately generates negative pressures in the first chamber 15 and the second chamber 17.

Figure 3:
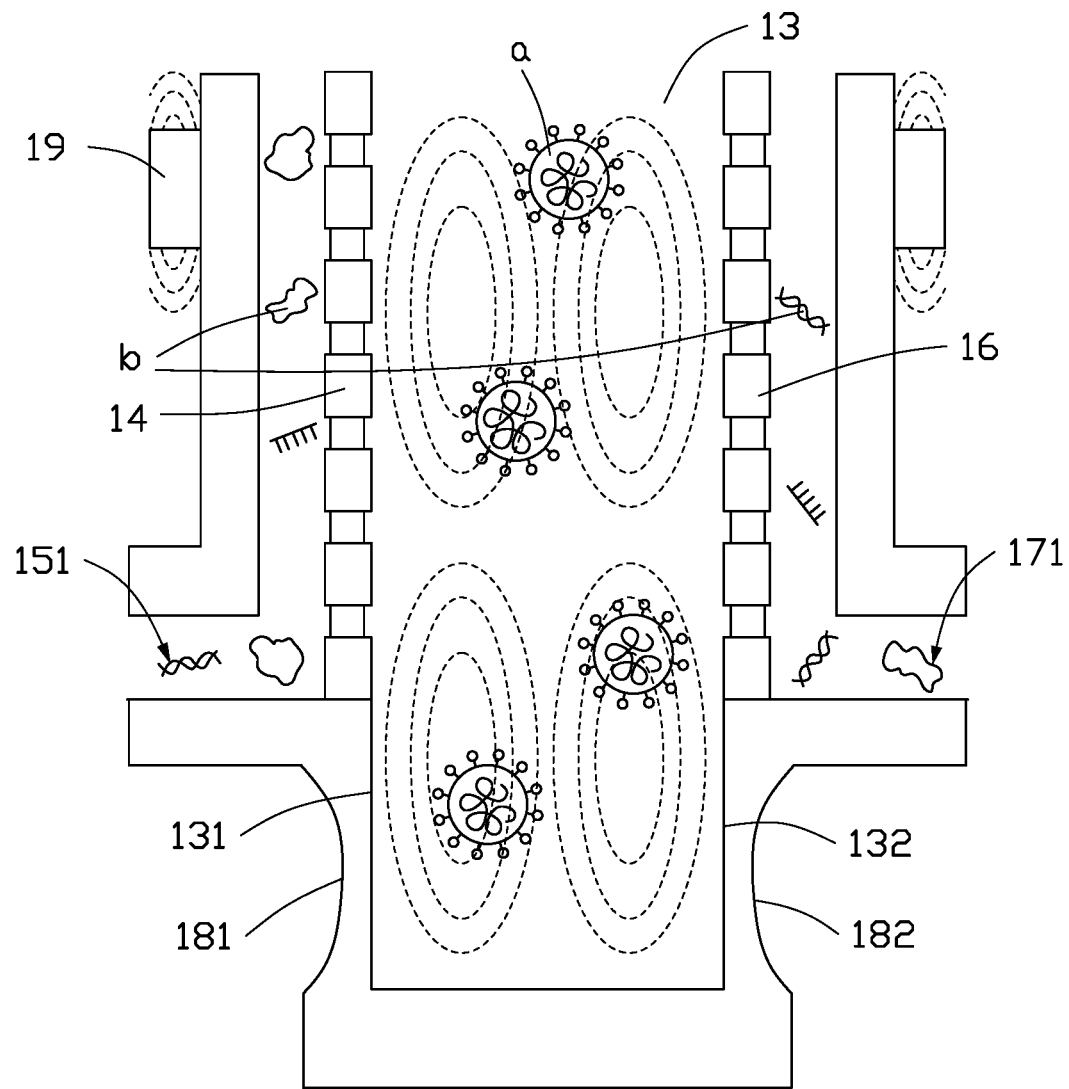
FIG. 3 is a diagrammatic view showing target particles of the liquid sample of FIG. 1 being isolated and purified.

The block 93 can be repeated for a number of times. Referring to FIGS. 2 and 3, the undesired particles "b" smaller than the sizes of the pores of the first filtration membrane 14 and the second filtration membrane 16 are removed from the reagent reservoir 13, and causing the target particles "a" to remain in the reagent reservoir 13. Moreover, since the first vibrator 191 and the second vibrator 192 vibrate, the target particles that are absorbed on the first filtration membrane 14 and the second filtration membrane 16 can be flushed out, thereby further avoiding clogging of the first filtration membrane 14 and the second filtration membrane 16.

Figure 4:
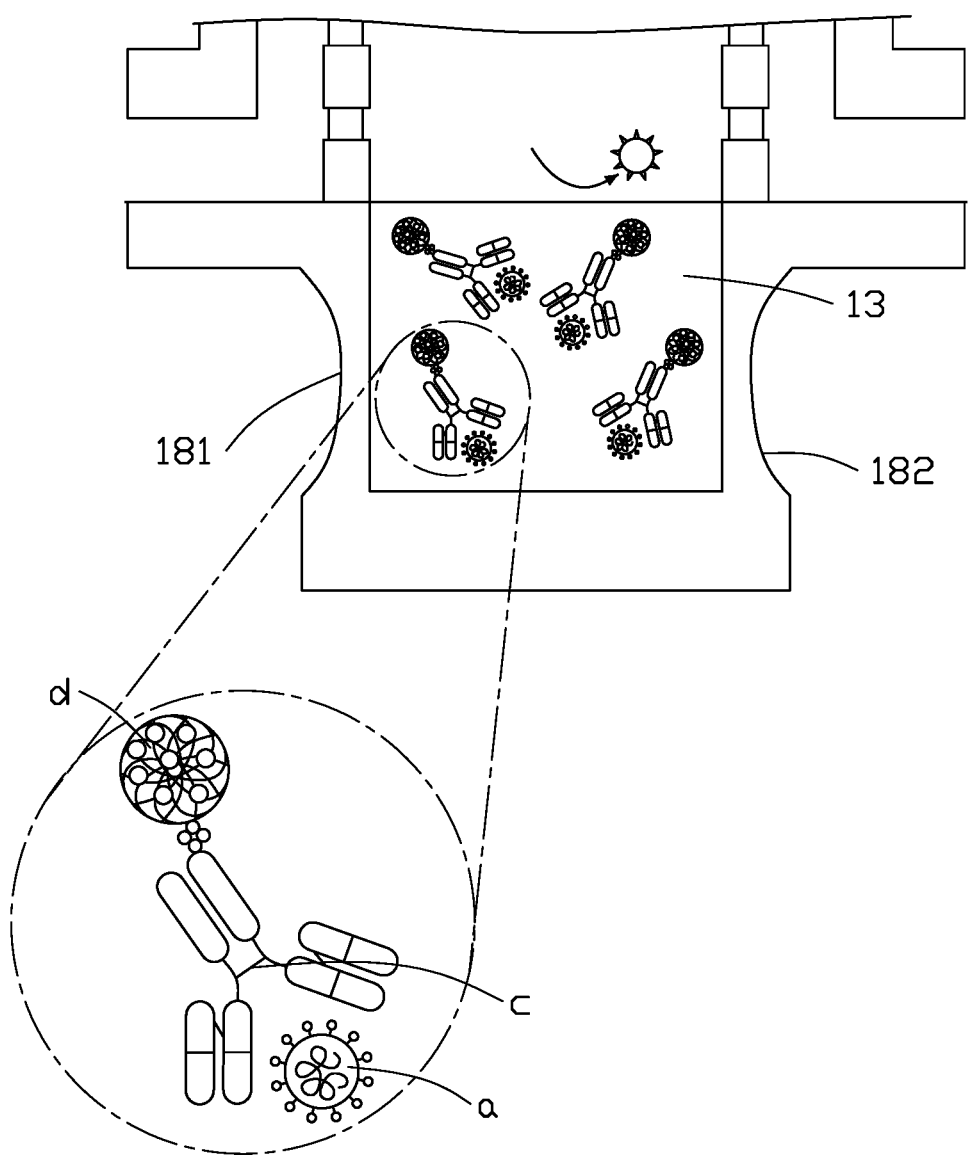
FIG. 4 is a diagrammatic view showing the target particles of FIG. 3 being processed.

At block 94, referring to FIG. 4, an enzyme-linked antibody "c" is added to the reagent reservoir 13, which is combined with the purified target particles "a" to form to-be-detected particles.

In an embodiment, the enzyme-linked antibody "c" can be Spike S1, S2, and N2 antibody. The first vibrator 191 and the second vibrator 192 continue to vibrate to cause the antibody to fully mix with the target particles, thereby ensuring the antibody to combine with the target particles.

At block 95, a washing buffer is added to the reagent reservoir 13, and the vacuum unit 30 alternately generates negative pressures in the first chamber 15 and the second chamber 17 to further remove excess unbonded antibody from the reagent reservoir 13, leaving the to-be-detected particles in the reagent reservoir 13. When the excess antibody is removed, an intensity of background signal can be reduced.

At block 96, the liquid sample in the reagent reservoir 13 is concentrated, to a volume of 50 μL for example, causing the unbonded antibody to further be removed and the to-be-detected particles to be precipitated at the bottom of the reagent reservoir 13.

At block 97, a chemiluminescent substrate "d" is added to the sample reservoir 13, which is reactive with the enzyme labeled on the antibody to generate optical signal.

At block 98, the optical signal from the to-be-detected particles is collected by the light collection unit 20 through the first window 181 and the second window 182, and is converted to electrical signal.

At block 99, the electrical signal is analyzed to detect information of the target particles.

EXAMPLE

Liquid samples were prepared by adding different amounts of SARS-CoV-2 (250, 1250, 2500 copies/mL) in to 2 mL of saliva from a healthy donor. A negative sample with virus of 0 copy/mL was used to measure baseline signal. After purification and isolation, each liquid sample was concentrated to 50 μL. The target particles of each liquid sample were then incubated with HRP-linked antibody Spike S1, S2, N2 (GeneTex, tested to be reactive to SARS-CoV viruses). The antibody-labeled viruses were washed to remove the excess antibody and HRP. The antibody-labeled material was then mixed with HRP substrate to generate optical signal via chemiluminescent reaction. The above process took for less than 15 minutes.

Figure 10:
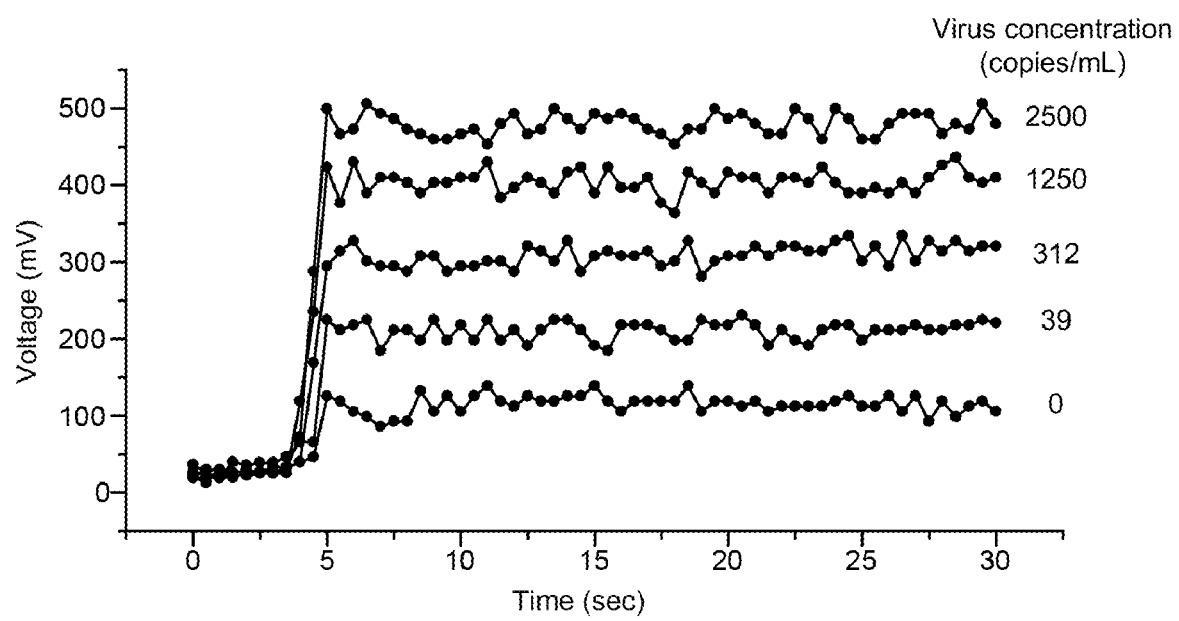
FIG. 10 is a diagram showing intensities of optical signals detected by the device of the EXAMPLE in relation to concentrations of viruses.
Figure 11:
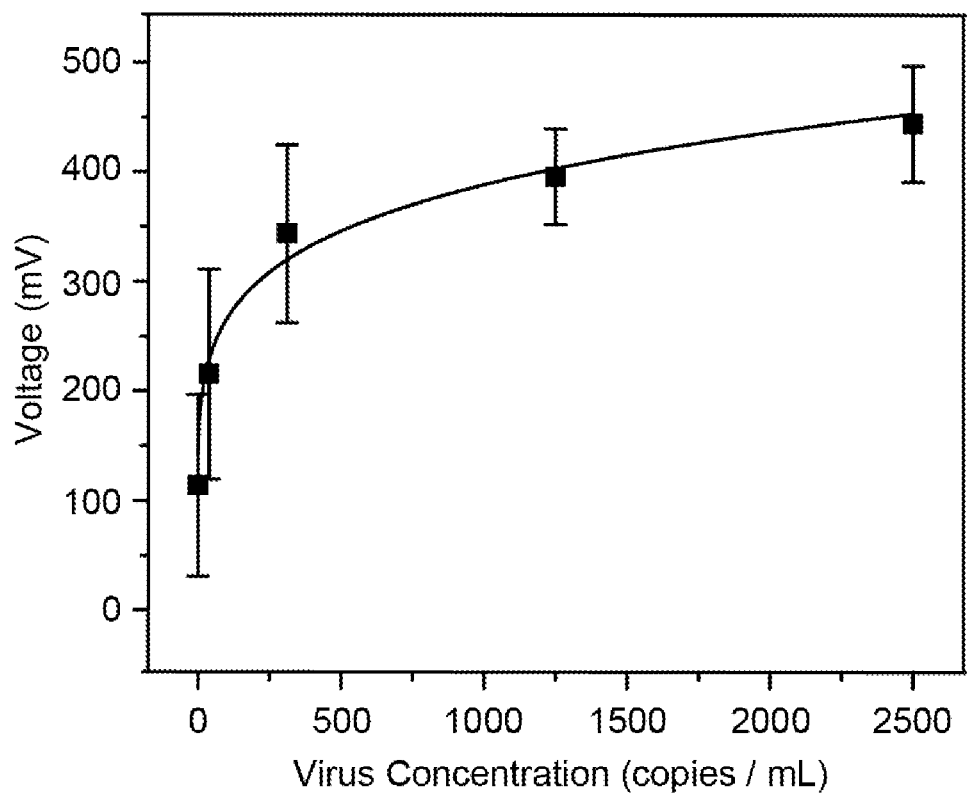
FIG. 11 is a diagram showing average signal intensities of the optical signals in relation to concentrations of viruses when curves of FIG. 10 are plateaued.

The HRP work as enzyme for CLIA reaction with the chemiluminescent substrate by producing optical signal with peak at 425 nm. The optical signal was collected and analyzed. FIGS. 10 and 11 show that different intensities of the optical signals are detected by the device. Furthermore the intensity of the optical signal is decreased when the amount of SARS-CoV-2 is decreased. Thus, the device 100 shows a high virus detection sensitivity for detecting virus of low quantities.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An isolation chip for isolating target particles from a liquid sample, comprising:
    a reagent reservoir configured for receiving the liquid sample, the reagent reservoir comprising a first sidewall and a second sidewall opposite to the first sidewall;
    a first filtration membrane disposed at an upper portion of the first sidewall, the reagent reservoir defining a first window at a lower portion of the first sidewall, the first window configured to face the to-be-detected particles in a bottom of the reagent reservoir;
    a second filtration membrane disposed at the second sidewall;

a first chamber connected to the reagent reservoir through the first filtration membrane, the first chamber defining a first outlet connecting the first chamber to an ambient environment; and a second chamber connected to the reagent reservoir through the second filtration membrane.

2. The isolation chip of claim 1, wherein the reagent reservoir further defines a second window at a lower portion of the second sidewall.

3. The isolation chip of claim 2, further comprising a first lens disposed in the first window and a second lens disposed in the second window.

4. The isolation chip of claim 3, wherein each of the first lens and the second lens is a concave lens.

5. The isolation chip of claim 1, further comprising a first vibrator disposed at an outer sidewall of the first chamber, and a second vibrator disposed at an outer sidewall of the second chamber.

6. The isolation chip of claim 1, further comprising a first vibrator disposed at the first filtration membrane, and a second vibrator disposed at the second filtration membrane.

7. The isolation chip of claim 6, wherein a frequency of each of the first vibrator and the second vibrator is in a range of 100 Hz to 500 Hz or 5000 Hz to 500 kHz.

8. A device for detecting target particles, comprising:
an isolation chip configured to isolate the target particles form a liquid sample, the target particles after isolation configured to be processed to to-be-detected particles, the isolation chip comprising:
 a reagent reservoir configured for receiving the liquid sample, the reagent reservoir comprising a first sidewall and a second sidewall opposite to the first sidewall;
 a first filtration membrane disposed at an upper portion of the first sidewall, the reagent reservoir defining a first window at a lower portion of the first sidewall, the first window configured to face the to-be-detected particles in a bottom of the reagent reservoir;
 a second filtration membrane disposed at the second sidewall;
 a first chamber connected to the reagent reservoir through the first filtration membrane; and
 a second chamber connected to the reagent reservoir through the second filtration membrane;
a light collection unit configured to collect optical signal from the to-be-detected particles through the first window, and convert the optical signal to electrical signal; and
a processor configured to detect information of the target particles according to the electrical signal.

9. The device of claim 8, wherein the light collection unit comprises an optical fiber and an optical sensor, the optical fiber connects the first window to the optical sensor, the optical sensor is configured to receive the optical signal through the optical fiber and converts the optical signal to the electrical signal.

10. The device of claim 9, wherein the reagent reservoir further defines a second window at a lower portion of the second sidewall, the optical fiber further connects the second window to the optical sensor.

11. The device of claim 10, wherein the isolation chip further comprises a first lens disposed in the first window and a second lens disposed in the second window.

12. The device of claim 8, further comprising:
a vacuum unit connected to each of the first chamber and the second chamber; and
a frequency converting unit causing the vacuum unit to alternately generate negative pressures in the first chamber and the second chamber.

13. The device of claim 8, further comprising a reagent provider configured to provide the liquid sample, an enzyme-linked antibody, and a chemiluminescent substrate to the reagent reservoir, wherein the enzyme-linked antibody is selected to combine with the target particles to form the to-be-detected particles under catalyzation of the chemiluminescent substrate.

14. The device of claim 13, wherein the reagent provider configured to be mounted on the isolation chip;
wherein the reagent provider comprises a liquid sample cartridge for receiving the liquid sample, an antibody cartridge for receiving the enzyme-linked antibody, and a chemiluminescent substrate cartridge for receiving the chemiluminescent substrate, the liquid sample cartridge, the antibody cartridge, and the chemiluminescent substrate cartridge each comprises a space for receiving a respective reagent, a foil seals at a bottom of each of the space, and a tube connects to each of the space, each of the space is connected to a gas pump through the tube;
when the reagent provider is mounted on the isolation chip, the foil is punched by the isolation chip, and the gas pump facilitates the respective reagent to be injected into the reagent reservoir.

15. The device of claim 14, further comprising a light sensing unit, wherein the light sensing unit comprises a point laser source and a light sensor aligned with the point laser source, the point laser source and the light sensor are disposed at opposite sides of the reagent reservoir, the processor is electrically connected to the light sensor;
wherein the point laser source is configured to emit a point laser towards the reagent reservoir, the light sensor is configured to receive the point laser through the reagent reservoir, the processor is configured to control the gas pump to stop loading the reagent when a laser intensity of the point laser detected by the light sensor is lower than a preset intensity.

16. The device of claim 8, wherein the isolation chip further comprises a first vibrator disposed at an outer sidewall of the first chamber, and a second vibrator disposed at an outer sidewall of the second chamber.

17. The device of claim 8, wherein the isolation chip further comprises a first vibrator disposed at the first filtration membrane, and a second vibrator disposed at the second filtration membrane.

18. The device of claim 17, wherein a frequency of each of the first vibrator and the second vibrator is in a range of 100 Hz to 500 Hz or 5000 Hz to 500 kHz.

* * * * *